Patented Nov. 15, 1938

2,136,503

UNITED STATES PATENT OFFICE 2,136,503

N-SUBSTITUTED PYRIDINE CARBOXYL AMIDE MERCURIC COMPOUND

Max Hartmann and Leandro Panizzon, Riehen, near Basel, Switzerland, assignors to the firm Society of Chemical Industry in Basle, Basel, Switzerland No Drawing. Original application December 31, 1934, Serial No. 760,052. Divided and this application September 9, 1937, Serial No. 163,154. In Switzerland December 13, 1934

3 Claims. (Cl. 260—242)

This application is a division of our application for patent Serial No. 760,052, filed in the U. S. on December 31, 1934, Patent No. 2,136,501 and in Switzerland on January 6, 1934 and December 13, 1934.

The present invention relates to water-soluble heterocyclic mercury compounds by mercurating amides of pyridine-carboxylic acids the amide-nitrogen of which is substituted by β (N-mercuric theophylline) propanol.

As mercurating agents may be used mercury oxide or mercury salts.

When using normal mercuric salts such as, for example, mercuric acetate, an equivalent of acid is split off in the course of the reaction which must be separated from the final product formed. This can be avoided by using basic mercuric salts instead of normal mercuric salts, or, respectively, a mixture consisting of 1 molecular proportion of mercuric oxide and 1 equivalent proportion of an organic compound capable of forming metal salts, or of ½ molecular proportion of mercuric oxide and ½ molecular proportion of a normal mercuric salt. As compounds capable of forming metal salts there may be named for instance acetic acid, propionic acid, tartaric acid, benzoic acid, disubstituted xanthines such as theophylline, theobromine and the like. When using mercuric oxide alone, the compounds obtained may, if desired, subsequently be converted into their salts by addition of 1 equivalent proportion of an organic compound capable of forming metal salts. If a free carboxylic group is still present in the molecule of the starting material besides the carbonamide group, this acid group is capable of forming salts.

Mercuric compounds free from disubstituted xanthines may be converted into corresponding zanthine derivatives by treating the former with disubstituted xanthines.

The new compounds obtainable in accordance with the invention are very potent but well tolerated diuretics and antiseptics useful for therapeutic purposes.

The following examples illustrate the invention, the parts being by weight:

Example 1

162 parts of pyridine-3-carboxylic acid-allylamide of the formula

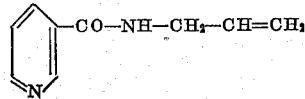

(melting point 48° C.; boiling point 180° at 4 mm. pressure, produced from pyridine-3-carboxylic acid chloride and allylamine) are dissolved in water and mixed with an aqueous solution of 310 parts of mercuric acetate. The whole is heated for several hours on the water-bath and then evaporated to dryness at low temperature. The residue is crystallized from methyl alcohol. The new mercury compound of the formula

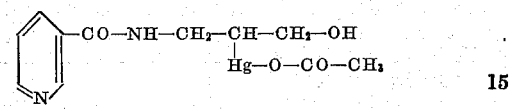

is obtained in the form of white crystals which are easily soluble in water, sinter near 160° C., and decompose at about 170° C. The content of mercury amounts to 45.5 per cent. The aqueous solution is stable towards caustic soda solution even in the heat.

The above mercury compound may also be obtained by causing an aqueous solution of 16 parts of pyridine-3-carboxylic acid-allylamide to react in the heat with 21 parts of mercuric oxide and 6 parts of acetic acid.

Example 2

An aqueous solution of 16 parts of pyridine-3-carboxylic acid-allylamide is vigorously shaken in the boiling heat in the presence of 21 parts of freshly precipitated mercuric oxide. When the reaction is complete the whole is filtered and the aqueous solution evaporated under a reduced pressure. The pyridine-3-carboxylic acid-[β-hydroxymercuric-γ-hydroxy-propyl-]-amide forms a white crystalline powder, stable towards caustic soda solution and showing a decomposition point of about 120° C. If 3.9 parts of this compound are mixed with 6 parts by volume of acetic acid of 10 per cent. strength, pyridine-3-carboxylic acid-[β-acetoxymercuric-γ-hydroxypropyl-]-amide is obtained after evaporation of the solution formed, which product corresponds in its properties with the compound obtained according to Example 1.

Example 3

An aqueous solution of 206 parts of pyridine-3- carboxylic acid-2-carboxylic acid-allylamide of the formula

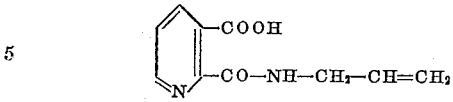

(melting point 87° C., prepared from pyridine-2:3-dicarboxylic acid anhydride and allylamine in a benzene solution in the cold) is mixed in the heat with 217 parts of mercuric oxide. In the course of this process the mercuric oxide goes into solution and on further heating the pyridine-3-carboxylic acid-2-carboxylic acid-[β-hydroxymercuric - γ - hydroxy - propyl-]-amide of the formula

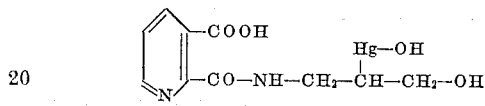

is precipitated in the form of a white substance which can be thoroughly purified by dissolving in caustic soda solution and precipitating with acetic acid. It has a decomposition point of about 205° C. The analysis shows a content of mercury of 45.3 per cent. (calculated 45.5 per cent.). The acid forms water-soluble salts with alkali, alkaline earth, organic bases and the like. The free acid is dissolved in the calculated quantity of caustic soda solution, the solution evaporated under a reduced pressure, and the dry sodium salt further purified by precipitating from little water and much alcohol. Its decomposition point lies at 140° C.

The alkali salts of the above compound are also obtained when starting from alkali salts of the pyridine-3-carboxylic acid-2-carboxylic acid-allylamide.

The above mercury compound can also be produced by causing 2 parts of pyridine-3-carboxylic acid-2-carboxylic acid-allylamide in aqueous solution to react in the heat with 3 parts of mercuric acetate.

*Example 4*

An aqueous solution of 16 parts of pyridine-3-carboxylic acid-allylamide is shaken strongly with 21 parts of mercuric oxide and 19.8 parts of theophylline at the boiling point. When the reaction is complete the solution is evaporated to dryness under a reduced pressure.

The new compound of the probable formula $$C_9H_{11}O_2N_2-Hg-O_7H_7O_2N_4$$

is obtained in the form of a white hygroscopic crystalline powder which melts at 95° C. and decomposes at 145° C.

*Example 5*

An aqueous solution of 4.6 parts of the sodium salt of the pyridine-3-carboxylic acid-2-carboxylic acid-[β-hydroxymercuric - γ - hydroxy-propyl-]-amide is mixed with 2 parts of theophylline. The solution is then evaporated under a reduced pressure, and the new compound of the probable formula

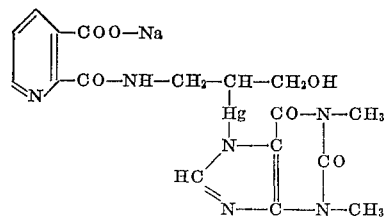

is obtained as an oil which, when triturated with alcohol, gives a solid white crystalline powder whose decomposition point lies at 215° C.

There are also obtained in a similar manner, for example, 6-hydroxypyridine-3-carboxylic acid-[β-acetoxymercuric-γ-hydroxy-propyl - ] - amide (melting point 128–129° C.), 6-chloropyridine-3-carboxylic acid-[β - acetoxymercuric-γ-hydroxy-propyl-]-amide (melting point 145° C.), 2-chloro-6-methylpyridine-4-carboxylic acid-[β-acetoxy-mercuric-γ-hydroxy - propyl - ] - amide (melting point 135–136° C.), pyridine-3-carboxylic acid-di-[β - acetoxymercuric-γ-hydroxy - propyl-]-amide (colorless oil), pyridine-3-carboxylic acid-[β-propionoxymercuric-γ-hydroxy-propyl -] - amide (melting point 145° C.), pyridine-3-carboxylic acid - [β-tartaroxymercuric-γ-hydroxy-propyl-]-amide (melting point 85° C., decomposition point 140° C.) and pyridine-3-carboxylic acid-[β-benzoyloxymercuric - γ - hydroxy - propyl - ] - amide (melting point 55–60° C.).

What we claim is:

1. A pyridine carboxyl acid amide with not more than one carboxylic acid group, the amide nitrogen of which is substituted by the group

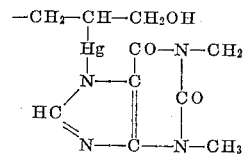

2. The compound of the formula

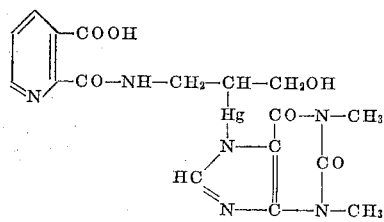

forming water-soluble salts with alkalies.

3. The compound of the formula

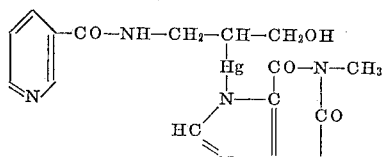

MAX HARTMANN.
LEANDRO PANIZZON.